US010186903B2

(12) United States Patent
Van Goor et al.

(10) Patent No.: US 10,186,903 B2
(45) Date of Patent: Jan. 22, 2019

(54) ELECTRICAL BREAKDOWN PROTECTION FOR A CAPACITIVE WIRELESS POWERING SYSTEM

(71) Applicant: PHILIPS LIGHTING HOLDING B.V., Eindhoven (NL)

(72) Inventors: Dave Willem Van Goor, Nederweert eind (NL); Theodorus Johannes Petrus Van Den Biggelaar, Veldhoven (NL); Oscar Hendrikus Hendrikus Willemsen, Den Bosch (NL); Lennart Yseboodt, Vorselaar (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 556 days.

(21) Appl. No.: 14/423,723

(22) PCT Filed: Aug. 9, 2013

(86) PCT No.: PCT/IB2013/056525
§ 371 (c)(1),
(2) Date: Feb. 25, 2015

(87) PCT Pub. No.: WO2014/033572
PCT Pub. Date: Mar. 6, 2014

(65) Prior Publication Data
US 2015/0263570 A1 Sep. 17, 2015

Related U.S. Application Data

(60) Provisional application No. 61/693,959, filed on Aug. 28, 2012.

(51) Int. Cl.
*H02J 50/05* (2016.01)
*H02J 50/70* (2016.01)
(Continued)

(52) U.S. Cl.
CPC .............. *H02J 50/05* (2016.02); *B32B 5/00* (2013.01); *B32B 17/06* (2013.01); *B32B 21/04* (2013.01);
(Continued)

(58) Field of Classification Search
None
See application file for complete search history.

(56) References Cited

U.S. PATENT DOCUMENTS 7,509,092 B2 * 3/2009 Ishibashi ............. H04B 5/0012
340/5.52
8,558,410 B2 * 10/2013 Itkonen ................. H02J 5/005
307/104

(Continued)

FOREIGN PATENT DOCUMENTS

GB      1224800 A    3/1971
JP     S48011872 B   4/1973
(Continued)

OTHER PUBLICATIONS

P. Marek et al; "A New Approach in Insulation Systems for Rotating Machines", Diagnostics for Electric Machines, Power Electronics and Drives, 2005, DEMPED 2005, 5th IEEE International Symposium on, Pisctaway, NJ, Sep. 7, 2005, pp. 1-5, XP031354953.

*Primary Examiner* — Lincoln D Donovan
*Assistant Examiner* — Diana J. Cheng
(74) *Attorney, Agent, or Firm* — Akarsh P. Belagodu

(57) ABSTRACT

An article of manufacture (130) for protecting a capacitive power transfer system (100) from electrical breakdowns is disclosed. The article of manufacture comprises a non-conductive layer (210) made of a first type of non-conductive material, and a protection layer (220) made of a second type of non-conductive material, wherein a breakdown voltage of the second type of non-conductive material is higher than a breakdown voltage of the first type of non-conductive (Continued)

material, wherein the protection layer covers only a portion of the non-conductive layer, where in the non-conductive layer and the protection layer form an insulating layer (130) of the capacitive power transfer system.

14 Claims, 4 Drawing Sheets

(51) Int. Cl.
*H02J 7/02* (2016.01)
*H04B 5/00* (2006.01)
*B32B 5/00* (2006.01)
*B32B 17/06* (2006.01)
*B32B 21/04* (2006.01)
*B32B 29/00* (2006.01)
*H02J 17/00* (2006.01)

(52) U.S. Cl.
CPC ............ *B32B 29/002* (2013.01); *H02J 7/025* (2013.01); *H02J 17/00* (2013.01); *H02J 50/70* (2016.02); *H04B 5/00* (2013.01); *B32B 2307/206* (2013.01); *B32B 2457/16* (2013.01); *Y10T 428/2476* (2015.01); *Y10T 428/24752* (2015.01); *Y10T 428/24769* (2015.01)

(56) References Cited

U.S. PATENT DOCUMENTS

| | | | | |
|---|---|---|---|---|
| 2009/0290286 | A1* | 11/2009 | Yun | H01G 4/08 361/325 |
| 2010/0087143 | A1 | 4/2010 | Bonin | |
| 2012/0181980 | A1* | 7/2012 | Ichikawa | H02J 7/025 320/108 |

FOREIGN PATENT DOCUMENTS

| | | |
|---|---|---|
| JP | H10201240 A | 8/1998 |
| JP | 2004511078 A | 4/2004 |
| JP | 2009296857 A | 12/2009 |
| KR | 1077411 B1 | 10/2011 |
| WO | 2013024432 A2 | 2/2013 |

\* cited by examiner

ELECTRICAL BREAKDOWN PROTECTION FOR A CAPACITIVE WIRELESS POWERING SYSTEM

CROSS-REFERENCE TO PRIOR APPLICATIONS

This application is the U.S. National Phase application under 35 U.S.C. § 371 of International Application No. PCT/IB13/056525, filed on Aug. 09, 2013, which claims the benefit of U.S. Provisional Patent Application No. 61/693,959, filed on Aug. 28, 2012. These applications are hereby incorporated by reference herein.

The invention generally relates to capacitive powering systems for wireless power transfers and, more particularly, to wireless power transfers over large area surfaces and protection of such surfaces from electrical breakdowns.

A wireless power transfer refers to the supply of electrical power without any wires or contacts, whereby the powering of electronic devices is performed through a wireless medium. One popular application for wireless (contactless) powering is for the charging of portable electronic devices, e.g., mobile phones, laptop computers, and the like.

One implementation for wireless power transfers is by an inductive powering system. In such a system, the electro-magnetic inductance between a power source (transmitter) and the device (receiver) allows for wireless power transfers. Both the transmitter and receiver are fitted with electrical coils, and when brought into a physical proximity, an electrical signal flows from the transmitter to the receiver.

In inductive powering systems, the generated magnetic field is concentrated within the coils. As a result, the power transfer to the receiver pick-up field is very concentrated in space. This phenomenon creates hot-spots in the system which limits the efficiency of the system. To improve the efficiency of the power transfer, a high quality factor for each coil is needed. To this end, the coil should be characterized with an optimal ratio of inductance to resistance, be composed of materials with low resistance, and fabricated using a Litze-wire process to reduce skin-effect. Moreover, the coils should be designed to meet complicated geometries to avoid Eddy-currents. Therefore, expensive coils are required for efficient inductive powering systems. A design for a contactless power transfer system for large areas would necessitate many expensive coils. Thus, for such applications an inductive powering system may not be feasible.

Capacitive coupling is another technique for transferring power wirelessly. This technique is predominantly utilized in data transfer and sensing applications. A car-radio antenna glued on the window with a pick-up element inside the car is an example of a capacitive coupling. The capacitive coupling technique is also utilized for contactless charging of electronic devices. For such applications, the charging unit (implementing the capacitive coupling) operates at frequencies outside the inherent resonant frequency of the device.

In the related art, a capacitive power transfer circuit that enables LED lighting is also discussed. The circuit is based on an inductor in the power source (driver). As such, only a single receiver can be used and the transmitter should be tuned to transfer the maximum power. In trying to design a system with multiple receivers, such a system would require pixelated electrodes that ensure power transfer from the receiver and transmitter when they are not perfectly aligned. However, increasing the number of the pixelated electrodes increases the number of connections to the electrodes, thereby increasing the power losses. If no pixelated electrodes are used, then it would not be feasible to tune all receivers to the same resonant frequency. Thus, when having only a single receiver and limited size electrodes, the capacitive power transfer circuit discussed in the related art cannot supply power over large areas, e.g., windows, walls, and so on.

Another challenge in designing a low-cost and efficient wireless power transfer system for large areas is related to the electrical breakdown of the insulator between the transmitter side and receiver side of the system. To provide a low-cost system, low-cost non-conductive materials are utilized as the insulating layer. However, such materials tend to electrically breakdown at a relatively low breakdown voltage. Typically, an electrical breakdown refers to the breakdown of the insulator of, for example, an electrical wire or an insulating layer, causing the insulator to become electrically conductive. The electrical breakdown occurs at the breakdown voltage which is the minimum voltage that causes at least a portion of an insulator to become electrically conductive.

To protect a capacitive power transfer system from electrical breakdowns, non-conductive materials robust to such breakdowns can be utilized in the insulating layer. However, such materials cost significantly more than frail materials. Thus, for capacitive power transfer systems designed for power transfer over a large area surface, the entire surface (e.g., a wall's surface) needs to be covered with a robust material to provide an insulating layer that is protected from electrical breakdowns. However, such a design would significantly increase the cost of the capacitive power transfer system.

Therefore, it would be advantageous to provide a low cost and feasible solution to protect wireless powering systems designed for large areas from electrical breakdowns.

Certain embodiments disclosed herein include an article of manufacture for protecting a capacitive power transfer system from electrical breakdowns. The article of manufacture comprises a non-conductive layer made of a first type of non-conductive material; and a protection layer made of a second type of non-conductive material, wherein a breakdown voltage of the second type of non-conductive material is higher than a breakdown voltage of the first type of non-conductive material, wherein the protection layer covers only a portion of the non-conductive layer, wherein the non-conductive layer and the protection layer form an insulating layer of the capacitive power transfer system.

Certain embodiments disclosed herein also include an article of manufacture designed to protect from electrical breakdowns in a capacitive power transfer system. The article of manufacture comprises a pair of electrodes made of a conductive material; a non-conductive layer made of a first type of non-conductive material that covers one side of the pair of electrodes; and a protection layer made of a second type of non-conductive material that covers the other side of the pair of electrodes, wherein a breakdown voltage of the second type of non-conductive material is higher than a breakdown voltage of the first type of non-conductive material, wherein the non-conductive layer and the protection layer form an insulating layer of the capacitive power transfer system.

Certain embodiments disclosed herein also include a capacitive powering system that comprises a pair of receiver electrodes connected to a load through an inductor, wherein the inductor is coupled to the load to resonate the system at a series-resonance frequency; a pair of transmitter electrodes connected to a driver; and an insulating layer including a non-conductive layer made of a first type of non-conductive material, and a protection layer made of a second type of non-conductive material, wherein a breakdown voltage of the second type of non-conductive material is higher than a breakdown voltage of the first type of non-conductive material, the protection layer covers only a portion of the non-conductive layer, wherein the pair of transmitter electrodes and the pair of receiver electrodes are located on opposite sides of the insulating layer, such that a capacitive impedance is formed between the pair of transmitter electrodes and the pair of receiver electrodes, wherein a power signal generated by the driver is wirelessly transferred from the pair of transmitter electrodes to the pair of receiver electrodes without causing electrical breakdowns in the system when a frequency of the power signal matches the series-resonance frequency of the first inductor and the capacitive impedance.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
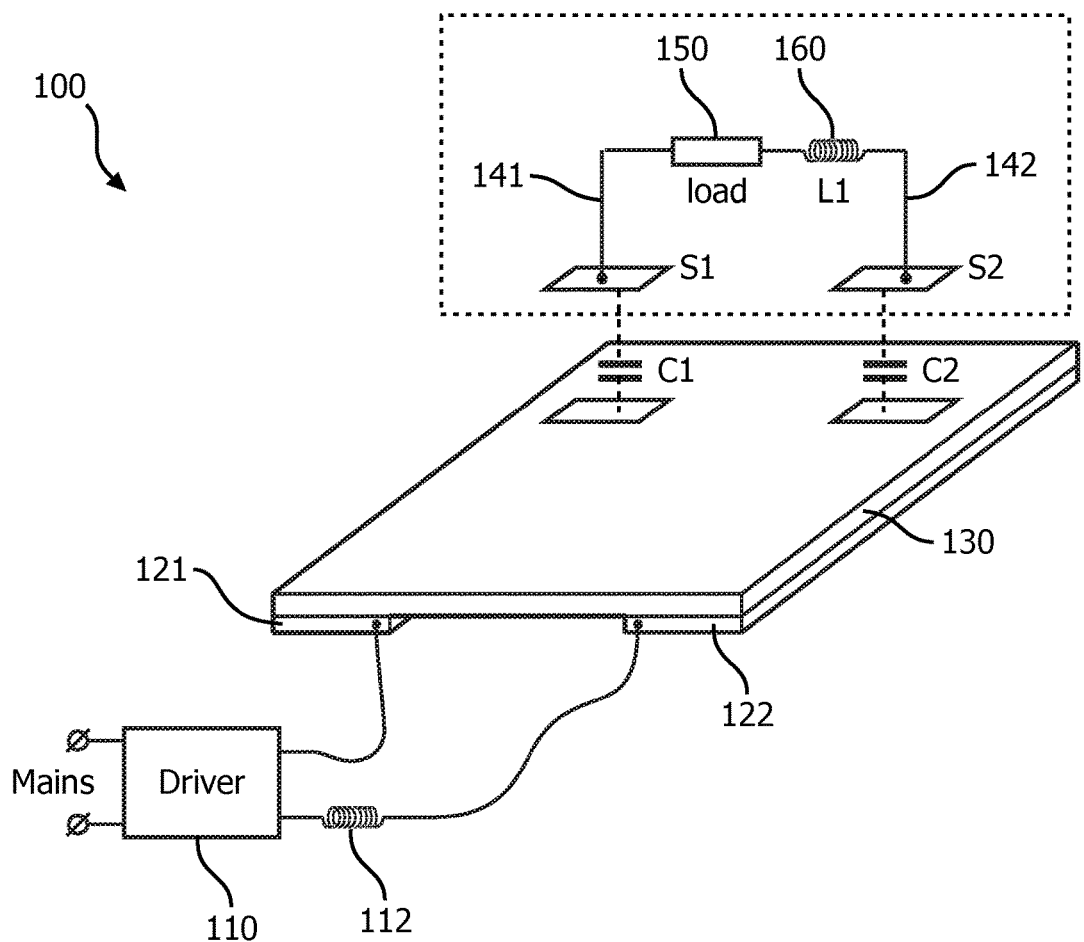
FIG. 1 is an illustration of a capacitive power transfer system utilized to describe various embodiments disclosed herein.

It is important to note that the embodiments are only examples of the many advantageous uses of the innovative teachings herein. In general, statements made in the specification of the present application do not necessarily limit any of the various claimed inventions. Moreover, some statements may apply to some inventive features, but not to others. In general, unless otherwise indicated, singular elements may be in plural and vice versa with no loss of generality. In the drawings, like numerals are intended to refer to like parts through several views.

FIG. 1 shows a schematic diagram of a capacitive power transfer system 100 utilized to describe various embodiments disclosed herein. The system 100 enables large area power transmissions. The system 100 can transfer power over a large area and thus can be utilized to power devices mounted on walls, windows, mirrors, floors, seats, aisles, and so on.

The system 100 includes a driver 110 connected to a pair of transmitter electrodes 121, 122 which are attached to an insulating layer 130. The system 100 also includes a pair of receiver electrodes 141 and 142 connected to a load 150 and an inductor 160. Optionally, the system 100 may include an inductor 112 coupled to the driver 110.

In certain configurations, the connection between the transmitter electrodes 121,122 to the driver 110 is by means of a galvanic contact. In another embodiment, a capacitive in-coupling can be applied between the driver 110 and the electrodes 121,122, whereby no wire connections are needed. This embodiment is advantageous in a modular infrastructure for easy extension of the infrastructure.

A power is supplied to the load 150 by placing the receiver electrodes 141, 142 in proximity to the transmitter electrodes 121 and 122 without having a direct contact between the receiver and transmitter electrodes. Thus, no mechanical connection or electrical contact is required in order to power the load 150. The load 150 allows for an AC bi-directional current flow. The load 150 may be, but is not limited to, lighting elements (e.g., LED, LED string, a lamp, etc.), displays, computers, power charges, loudspeakers, and the like. In certain configurations, the load 150 may include a diode or an AC/DC converter to locally generate a DC voltage. The load 150 may also include electronics for controlling or programming various functions of the load 150 based on a control signal generated by the driver 110.

The driver 110 outputs an AC voltage signal having a frequency that is the same as the series-resonance frequency of a circuit consisting of a series of capacitors and inductors 112, 160. Shown in dotted lines in FIG. 1 the capacitors C1 and C2 are the capacitive impedance formed between the transmitter electrodes 121, 122 and receiver electrodes 141, 142. The impedances of the capacitors and inductor 160 cancel each other at the resonance frequency, resulting in a low-ohmic circuit. Thus, the system 100 is capable of delivering power to the load 150 with very low power losses.

The driver 110 generates an AC signal of which amplitude, frequency, and waveform can be controlled. The output signal typically has an amplitude of tens of volts and a frequency of up to a few Mega hertz (MHz). In an exemplary embodiment, the output signal is typically 50V/400 kHz.

To match the series-resonance frequency to the frequency of the AC power signal, frequency tuning between the generated signal and series-resonance can be performed by changing the frequency, phase, or duty cycle of the signal output by the driver 110. The frequency tuning can be achieved by changing the capacitance or inductive values of the circuit connected to the driver 110.

The transmitter electrodes 121, 122 are comprised of two separate bodies of conductive material placed on one side of the insulating layer 130 that is not adjacent to the receiver electrodes 141, 142. For example, as illustrated in FIG. 1, the transmitter electrodes 121, 122 are at the bottom of the insulating layer 130. Alternatively, the transmitter electrodes 121, 122 can be placed on opposite sides of the insulating layer 130. The transmitter electrodes 121, 122 can be any shape including, for example, a rectangle, a circle, a square, or combinations thereof. The conductive material of each of the transmitter electrodes may be, for example, carbon, aluminum, indium tin oxide (ITO), organic material, such as PEDOT(poly(3,4-ethylenedioxythiophene)), copper, silver, conducting paint, or any conductive material.

The receiver electrodes 141, 142 can be of the same conductive material as the transmitter electrodes 121, 122, or made of different conductive material. In one embodiment discussed in detail below, the receiver electrodes 141,142 include a protection layer to protect from electrical breakdowns.

The total capacitance of the system 100 is formed by the overlap areas of respective transmitter and receiver electrodes 121, 141, and 122, 142, as well as the thickness and material properties of the insulating layer 130. The capacitance of the system 100 is illustrated as C1 and C2 in FIG. 1. In order to allow electrical resonance, the system 100 should also include an inductive element. This element may be in a form of one or more inductors that are part of the transmitter electrodes or the receiver electrodes, distributed over the driver 110 and the load (e.g., inductors 160 and 112 shown in FIG. 1), inductors incorporated within insulating layer 130, or any combination thereof. The inductor utilized in the system 100 can be in a form of a lumped coil.

According to various embodiments disclosed herein, the insulating layer 130 is constructed to include a protection layer protecting the system 100 from an electrical breakdown. As noted above, the amplitude of the AC signal generated by the driver 110 may be tens of volts. The resonant circuit (resulting from the inductive element and the capacitive impedance discussed above) increases the voltage amplitude of the generated signal. For example, a generated AC signal having a voltage amplitude of 50V can be increased to an amplitude of several hundred volts between the inductor and capacitor of the resonant circuit. The high voltage signal can reach the breakdown voltage of the insulating layer, thereby causing an electrical breakdown in the capacitive power transfer system. The factor by which the voltage amplitude of the generated AC signal is increased is determined by the Q factor of the resonant circuit.

Figure 2:
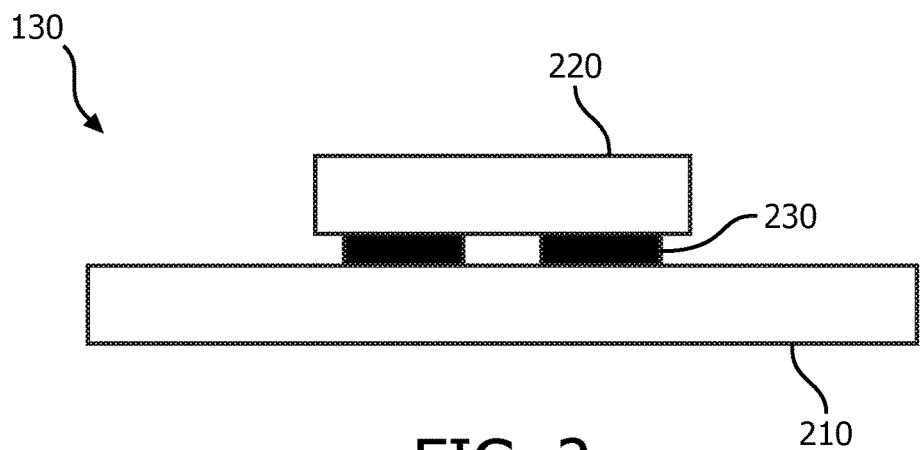
FIG. 2 is a cross-section diagram of the insulating layer constructed according to one embodiment.

An exemplary and non-limiting cross-section diagram of the insulating layer 130 constructed according to one embodiment is depicted in FIG. 2. The insulating layer 130 includes a non-conductive layer 210, a protection layer 220, and a filling layer 230 in-between. The non-conductive layer 210 is a thin layer substrate material that can be of any insulating material, including, for example, paper, wood, textile, Teflon, glass, DI-water, non-conductive paint, and so on. In one embodiment, a low-cost material which could have a low dielectric permittivity value is selected for the non-conductive layer 210. Typically, the breakdown voltage of such materials is relatively low. For example, the breakdown voltage of a sheet of paper is 1250V, and the breakdown voltage of glass is 2000V-3000V. The non-conductive layer 210 covers the entire surface through which the power signal can be wirelessly transferred. For example, if the system 100 is designed to transfer power over a wall, the non-conductive layer 210 covers the entire wall. In this example, the non-conductive layer 210 can be made of wallpaper.

In another embodiment disclosed herein, the insulating layer 130, structured as shown in the exemplary and non-limiting FIG. 2, is utilized to "hide" the receiver electrodes. Thus, when an aesthetic design is required, the insulating layer 130 including the non-conductive and protection layers 210 and 220 can be designed as, for example, wallpaper, and like providing an aesthetic design to cover the receiver electrodes. It should be noted that in addition to the aesthetic aspect, the insulating layer 130 is also designed to protect from electrical breakdown and to sufficiently isolate the receiver and transmitter electrodes.

The protection layer 220 is a thin layer of insulating material having the properties of a high voltage breakdown, a low leakage current, and a high dielectric permittivity value. The material of the protection layer 220 may be, but is not limited to, plastic, Mica, Kapton, Metal Oxide, Silicon Oxide, Aluminum Oxide, and the like. For example, the breakdown voltage of a foil, having a thickness of 1 inch, of Mica material is 5000V.

The cost of the materials used for the protection layer is relatively higher than the materials of the insulating layer. However, the protection layer 220 covers only a portion of the surface in a location where the receiver electrodes are placed or can be placed, or the receiver electrodes are covered with the protective layer 220. This arrangement allows for efficiently protecting the capacitive power transfer system from electrical breakdowns, without any additional significant cost to the system. The thickness of the insulating layer 130 is typically between 10 microns and a few millimeters.

The filling layer 230 between the layers 210 and 220 depends on the arrangement of the insulating layer 130. The filling 230 may include the receiver electrodes or glue to allow adherence of the two layers 210 and 220 together. Different exemplary arrangements for the insulating layer 130 are discussed below. It should be noted that the filling layer 230 is optional.

In the embodiment illustrated in FIG. 2, the insulation layer 130 is constructed by stacking two different layers of different types of materials. In other embodiments, the insulating layer 130 can be constructed by stacking more layers of the non-conductive layer 210 and/or the protection layer 220. For example, two or more non-conductive layers having the same materials or different materials with similar properties can be utilized. For instance, wallpaper can be used as the non-conductive layers, where two or more sheets of paper can be stacked together, where one sheet of paper is the plain paper and the other sheet is the decorative paper.

In another embodiment, the non-conductive layer 210 and the protection layer 220 can be arranged in a sandwich-like structure to form the insulating layer 130. In one exemplary arrangement, the protection layer 220 can be placed in the middle between to two non-conductive layers 210 to provide more mechanical strength to the layer 130, and hence, to the infrastructure of the capacitive power transfer system.

In another exemplary arrangement, the non-conductive layer 210 can be placed in the middle between two protection layers 220 to improve the robustness against electrical breakdowns. It should be noted that stacking only materials with low dielectric permittivity values being used for the non-conductive layer 210 increases the leakage current, thereby increasing the power losses in the system. Each layer (either the non-conductive layer 210 or the protection layer 220) adds additional capacitance, in series, to the capacitance of the wireless power transfer system (e.g., capacitance of the system 100 illustrated as C1 and C2 in FIG. 1). This additional capacitance affects the amount of leakage current that flows through the insulating layer. The leakage current is a result of the dielectric material that is not a perfect insulator and has non-zero conductivity. In one embodiment, the protection layer 220 is designed to be as thin as possible in order to have the total capacitances C1 and C2 as high as possible. The number of the non-conductive and protection layers in the insulating layer affects the losses in the power transfer system in addition to the robustness to electrical breakdowns.

Figure 3:
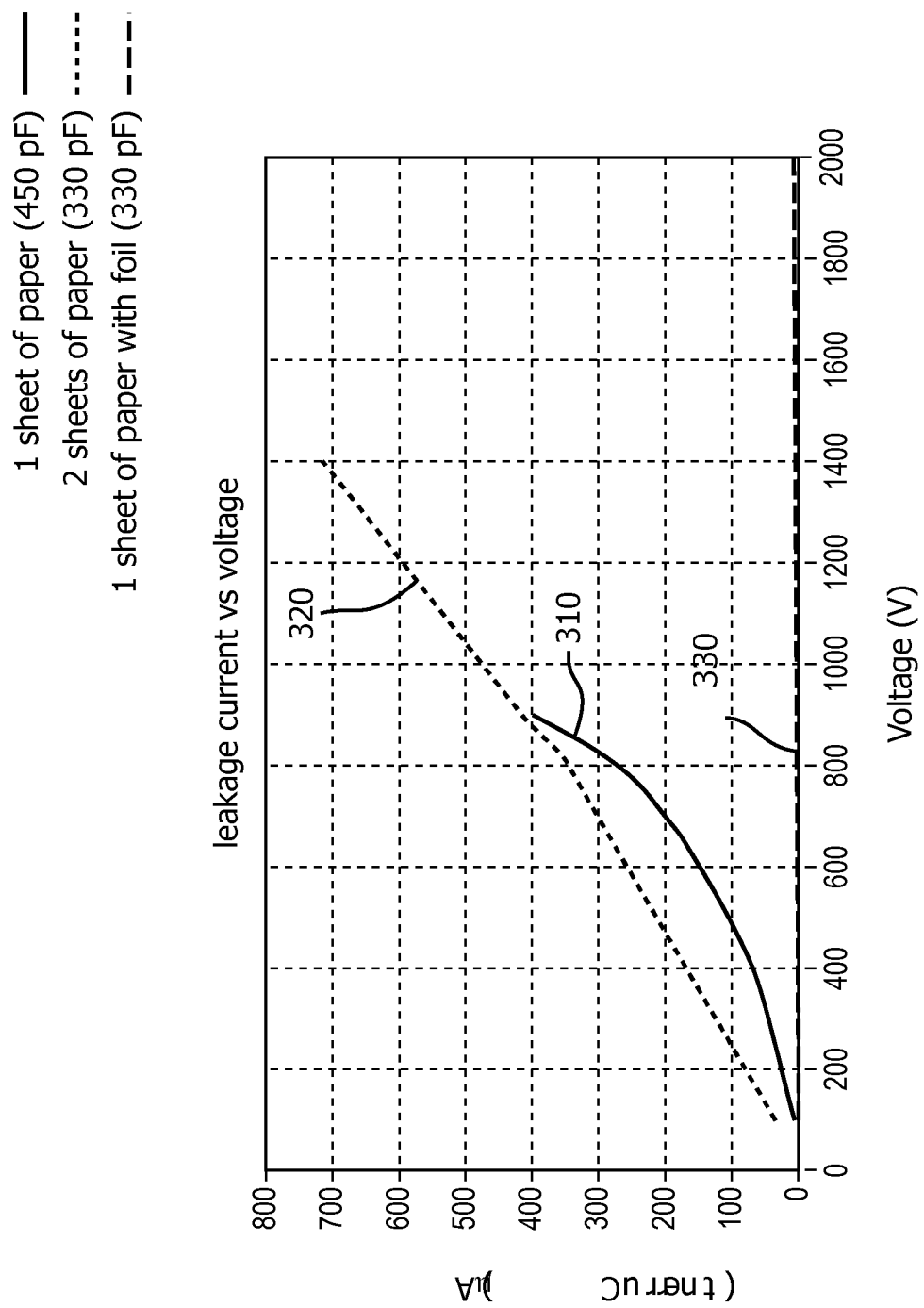
FIG. 3 depicts exemplary graphs of the measured current leakage and the breakdown voltage for different arrangements of the insulating layer.

FIG. 3 depicts exemplary graphs 310, 320 and 330 of the measured current leakage and the breakdown voltage for different arrangements of the insulating layer. The graphs 310, 320, and 330 represent the measured leakage current versus the voltage amplitude in the resonant circuit resulting from the inductive element and capacitive impedance discussed above.

The graph 310 depicts the breakdown voltage and leakage current for an insulating layer consisting of only a single non-conductive layer. In this example, this layer is a standard sheet of A4-size paper. As can be noticed by the graph 310, the breakdown voltage is at about 900V, while the maximum leakage current is 400 uA. The capacitance formed with one sheet of paper is 450 pF. Thus, such an arrangement would dissipate 0.36 W in the non-conductive layer, thereby heating the layer.

The graph 320 depicts the breakdown voltage and leakage current for an insulating layer consisting of only two non-conductive layers formed by stacking two standard sheets of A4-size print paper. The capacitance formed with one sheet of paper is 330 pF. In such an arrangement, while the breakdown voltage is increased to 1400V, the leakage current is also increased to about 700 uA. Thus, the power losses are higher in such an arrangement (e.g., 1 W).

The graph 330 depicts the breakdown voltage and leakage current for an insulating layer consisting of a non-conductive layer formed by a standard sheet of A4 print paper and a protection layer made of one sheet of plastic foil. The capacitance formed by stacking one sheet of paper and one sheet of plastic foil is 330 pF. As can be noticed by graph 330, no breakdown voltage occurs until 2000V, while the leakage current stays below 3 uA. Therefore, the arrangement of stacking one sheet of paper and one sheet of plastic foil can protect the capacitive power transfer system from electrical breakdowns, while not increasing the power losses in such a system. Furthermore, the additional protection layer can be added without substantially changing the capacitance of the insulating layer.

Figure 4:
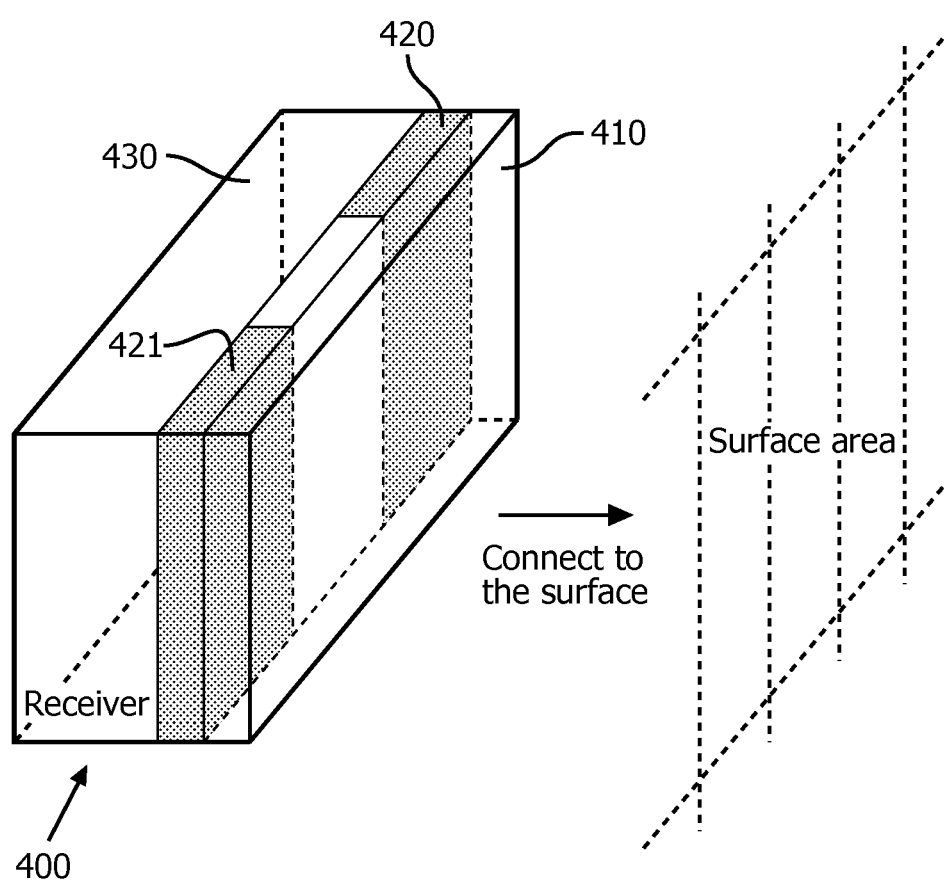
FIG. 4 is an illustration of a receiver of a capacitive power transfer system designed to include an electrical breakdown protection layer according to one embodiment.

The formation of the insulating layer in a capacitive power transfer system can be achieved using different embodiments. In one embodiment, illustrated in FIG. 4, in a receiver 400 of a capacitive power transfer system, a protection layer 410 is coupled to one side of receiver electrodes 420, 421.

As noted above, the receiver electrodes 420, 421 are made of conductive material. On the other side of the receiver electrodes 420, 421, the non-conductive layer 430 is coupled. As noted above, the protection layer 410 is made of non-conductive materials characterized by at least a high voltage breakdown. The protection layer 410 covers only the plates' area of the receiver electrodes 420, 421. The coupling of the protection layer 410 and the non-conductive layer 430 to the receiver electrodes 420, 421 can be made by means of electrical non-conductive glue, a non-conductive fabric, or mechanical means, e.g., screws, clips, nails, and the like.

In another embodiment, a stack of non-conductive and protection layers are applied to the infrastructure of a capacitive power transfer system to form the insulating layer. As illustrated in the exemplary and non-limiting FIG. 5, a non-conductive layer 500 is placed on an infrastructure 510, which may be for example, a wall, a ceiling, a floor, a door, and other surfaces that can be covered. The non-conductive layer 500 may be wallpaper, a glass layer, a wood layer, a paint layer, or any low-cost non-conductive material.

Figure 5:
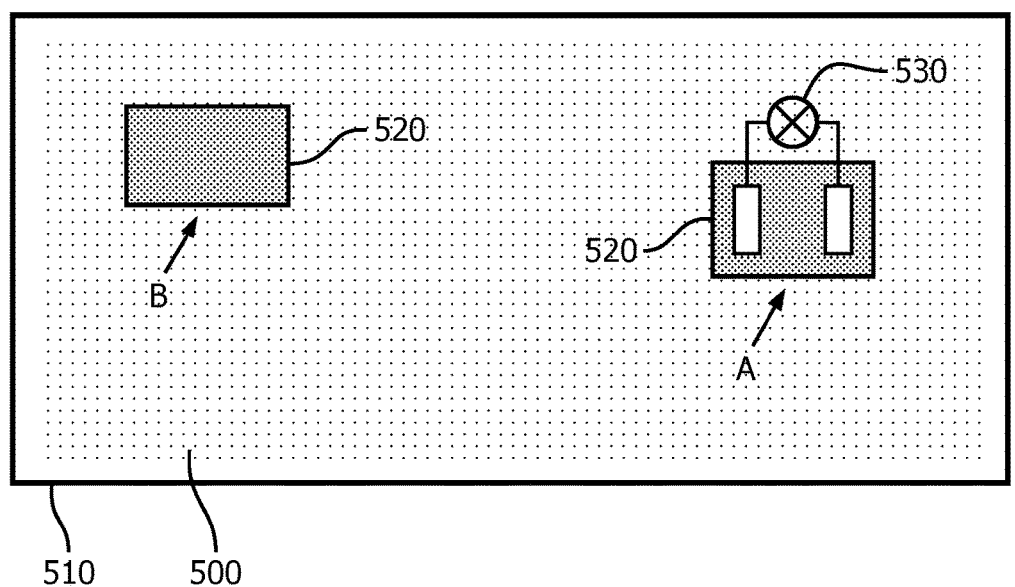
FIG. 5 is an illustration of an infrastructure of a capacitive power transfer system designed to include an electrical breakdown protection layer according to one embodiment.

A portion of a front side of the non-conductive layer 500 is covered with a protection layer 520. The protection layer 520 coverage is applied only on areas where the receiver electrodes and, thus the load, can be coupled to the infrastructure 510. Ordinarily, such areas are where the transmitter electrodes are also located (typically at the backside of the non-conductive layer 500). As depicted in FIG. 5, the protection layer 520 is applied in two different areas, labeled as 'A' and 'B'. A receiver 530 including the receiver electrodes and load is connected in area A. The protection layer 520 can be fixed to the infrastructure 510 and hence to the non-conductive layer 500 by means of an electrical non-conductive glue material, a non-conductive fabric material, or mechanical means, e.g., screws, clips, nails, and the like. A person of ordinary skill in the art would readily appreciate that other fixing means are applicable.

It should be noted that the various embodiments for forming the insulating layer to provide protection from electrical breakdowns disclosed herein can be utilized to protect the transmitter electrodes when a capacitive coupling is formed between the driver (e.g., the driver 110, FIG. 1) and transmitter electrodes (e.g., transmitter electrodes 121, 122, FIG. 1).

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An insulating layer for protecting a capacitive power transfer system from electrical breakdowns, comprising:
   a non-conductive layer made of a first type of non-conductive material; and
   a protection layer made of a second type of non-conductive material, wherein a breakdown voltage of the second type of non-conductive material is higher than a breakdown voltage of the first type of non-conductive material, wherein the protection layer covers only a portion of the non-conductive layer, wherein the non-conductive layer and the protection layer form the insulating layer of the capacitive power transfer system, wherein the protection layer is disposed between a pair of transmitter electrodes and a pair of receiver electrodes such that the protection layer electrically insulates the pair of transmitter electrodes from the pair of receiver electrodes.

2. The insulating layer of claim 1, wherein a dielectric permittivity value of the second type of non-conductive material is higher than a dielectric permittivity value of the first type of non-conductive material.

3. The insulating layer of claim 1, wherein the second type of non-conductive material is any one of: plastic, Mica Kapton, Metal Oxide, Silicon Oxide, and Aluminum Oxide.

4. The insulating layer of claim 1, wherein the first type of non-conductive material is any one of paper, wood, textile, glass, DI-water, and non-conductive paint.

5. The insulating layer of claim 1, wherein the second type of material is applied on one side of the pair of receiver electrodes of the capacitive power transfer system.

6. The insulating layer of claim 1, wherein the non-conductive layer is applied on an infrastructure of the capacitive power transfer system and the protection layer is applied on at least one portion of the non-conductive layer.

7. The insulating layer of claim 6, wherein the at least one portion is where capacitive coupling between the pair of receiver electrodes and the pair of transmitter electrodes of the capacitive power transfer system is formed.

8. The insulating layer of claim 1, wherein the insulating layer allows formation of a capacitive impedance between the pair of transmitter electrodes and a pair of receiver electrodes of the capacitive power transfer system.

9. The insulating layer of claim 8, wherein a power signal generated by a power driver is wirelessly transferred from the pair of transmitter electrodes, coupled to the insulating layer, to the pair of receiver electrodes connected to a load and an inductor in order to power the load when a frequency of the power signal substantially matches a series-resonance frequency of the inductor and the capacitive impedance.

10. A receiver used for a capacitive power transfer system designed to protect from electrical breakdowns in a capacitive power transfer system, comprising:
- a pair of electrodes made of a conductive material;
- a non-conductive layer made of a first type of non-conductive material that covers one side of the pair of electrodes with respect to the extending plane of the pair of electrodes; and
- a protection layer made of a second type of non-conductive material that covers the other side of the pair of electrodes with respect to the extending plane of the pair of electrodes, wherein a breakdown voltage of the second type of non-conductive material is higher than a breakdown voltage of the first type of non-conductive material, wherein the non-conductive layer and the protection layer form an insulating layer of the capacitive power transfer system.

11. The receiver of claim 10, wherein a dielectric permittivity value of the second type of non-conductive material is higher than a dielectric permittivity value of the first type of non-conductive material.

12. The receiver of claim 10, wherein the second type of non-conductive material is any one of: plastic, Mica, Kapton, Metal Oxide, Silicon Oxide, and Aluminum Oxide.

13. The receiver of claim 10, wherein the first type of non-conductive material is any one of paper, wood, textile, glass, DI-water, and non-conductive paint.

14. A capacitive powering system, comprising:
- a pair of receiver electrodes connected to a load through an inductor, wherein the inductor is coupled to the load to resonate the system;
- a pair of transmitter electrodes connected to a driver; and
- an insulating layer including a non-conductive layer made of a first type of non-conductive material, and a protection layer made of a second type of non-conductive material, wherein a breakdown voltage of the second type of non-conductive material is higher than a breakdown voltage of the first type of non-conductive material, the protection layer covers a portion of the non-conductive layer, wherein the pair of transmitter electrodes and the pair of receiver electrodes are located on opposite sides of the insulating layer, such that a capacitive impedance is formed between the pair of transmitter electrodes and the pair of receiver electrodes and the protection layer electrically insulates the pair of transmitter electrodes from the pair of receiver electrodes, wherein a power signal generated by the driver is wirelessly transferred from the pair of transmitter electrodes to the pair of receiver electrodes without causing electrical breakdowns in the system when a frequency of the power signal matches a series-resonance frequency of the first inductor and the capacitive impedance.

* * * * *